(12) United States Patent
Kim et al.

(10) Patent No.: US 8,400,980 B2
(45) Date of Patent: Mar. 19, 2013

(54) FAST HANDOVER SYSTEM AND METHOD THEREOF

(75) Inventors: Pyung Soo Kim, Seoul (KR); Eung Tea Kim, Gyeonggi-do (KR); Seong Yong Kim, Seoul (KR)

(73) Assignee: Korea Polytechnic University Industry Academic Cooperation Foundation, Gyeonggi-do (KR)

( * ) Notice: Subject to any disclaimer, the term of this patent is extended or adjusted under 35 U.S.C. 154(b) by 566 days.

(21) Appl. No.: 12/481,920

(22) Filed: Jun. 10, 2009

(65) Prior Publication Data

US 2009/0310564 A1 Dec. 17, 2009

(30) Foreign Application Priority Data

Jun. 11, 2008 (KR) .................. 10-2008-0054708

(51) Int. Cl.
  *H04W 4/00* (2009.01)
(52) U.S. Cl. ...................................... 370/331; 455/439
(58) Field of Classification Search .................. None
See application file for complete search history.

(56) References Cited

U.S. PATENT DOCUMENTS

| 7,369,856 | B2 * | 5/2008 | Ovadia ........................ 455/439 |
| 2006/0182104 | A1 * | 8/2006 | Lee et al. ..................... 370/389 |
| 2008/0301434 | A1 * | 12/2008 | Haddad et al. ............... 713/153 |
| 2009/0122750 | A1 * | 5/2009 | Sarikaya ...................... 370/328 |
| 2009/0245149 | A1 * | 10/2009 | Xia et al. ..................... 370/310 |

\* cited by examiner

*Primary Examiner* — Chi Pham
*Assistant Examiner* — Kouroush Mohebbi
(74) *Attorney, Agent, or Firm* — Kinney & Lange, P.A.

(57) ABSTRACT

Disclosed are a fast handover system and a method thereof. The fast handover method can include: allowing a mobile node (MN) to transmit a handover information message to a previous mobile access gateway (PMAG); allowing the PMAG to transmit a fast proxy binding update (FPBU) message to a local mobility anchor (LMA) on the basis of the handover information message received from the MN; allowing the LMA to transmit a handover initiation (HI) message including MN-ID and proxy-care-of address (CoA) of the PMAG to a new MAG (NMAG); transmitting a position update message to the NMAG if the MN is attached to a target BS that is connected to the NMAG; and allowing the NMAG to deliver a buffered packet to the MN.

16 Claims, 2 Drawing Sheets

FAST HANDOVER SYSTEM AND METHOD THEREOF

BACKGROUND

1. Technical Field

The present invention relates to a fast handover system and a method thereof, more specifically to a fast handover system and a method thereof that can minimize the handover latency when a mobile communication terminal moves in an environment of PMIPv6 mechanism.

2. Description of the Related Art

With rapidly increasing Internet users, there has recently been growing interests in the mobility of Internet service that attempt to access Internet in moving positions as well as fixed positions by using mobiles.

In the Internet, an Internet protocol (IP) address having a network identifier and a host identifier is assigned to a host. The host makes the connectivity with other hosts by using the assigned IP address. Accordingly, when the host makes and maintains the connectivity with other hosts, the IP address must be constantly maintained. If the IP address is changed, the previous connectivity will he disconnected and a new connectivity will be made.

When the Internet is used in fixed positions, the IP address is rarely changed. In contrast, if the Internet is used in moving positions, the previous connected network and the network identifier may move to other networks. At this time, a new IP address is assigned to the network identifier in other networks, and thus the host is required to make a new connectivity. This causes the service to be interrupted.

To solve the above problem, a mobile IP (MIP) was suggested, which can support the mobility of a mobile node (MN) via a home agent (HA) and a foreign agent (FA). Also, a mobile IPv6 (MIPv6) was suggested, which can support the mobility of an MN in IPv6.

The MIPv6 is developed for the mobility of the IPv6. In order to enable an MN to he moved, it is required to bind a home address (HoA) and a care of address (CoA) of the MN through the signaling between the MN and HA. The signaling between the MN and HA can be performed by adding an MIPv6 client function into the IPv6 stack of the MN. However, it is necessary to provide the IP mobility, regardless of the MIPv6 function, in consideration of the MNs having no MIPv6 function.

It is possible to support the mobility of the IPv6 MN by expanding the signaling in the MIPv6 by use of a proxy mobility agent (PMA) located at the network and by re-using the HA. Such method of supporting the mobility allows the MN not to involve in the signal exchanging process for managing the mobility. The PMA located at the network performs the MIPv6 signaling and manages the mobility instead of the MN. This method is called PMIPv6 because the existing MIPv6 signaling and the HA function are used as it is or expanded.

In the typical PMIPv6 mechanism, two mobile access gateways (MAG) involving in the handover of an MN exchange the signaling for setting the fast handover. The MAG is coupled to an access link in order to manage the signaling related to the mobility of the MN. The MAG also is the entity that monitors whether the MN is attached to the access link and performs the signaling with local mobility anchor (LMA) instead of the MN. At this time, two MAGs can share security association (SA) to protect a signaling message related to the fast handover. In this case, all MAGs are required to share the SA regardless of whether to be adjacent to each other. This has an effect on the state of each MAG related to the SA.

SUMMARY

The present invention provides a fast handover system and a method thereof that may not need the signaling between mobile access gateways (MAG) to set a fast handover and thus may not be required to share security association to protect a signaling message related to the fast handover between the MAGs.

To solve the above problems, a fast handover method according to an embodiment of the present invention can include allowing a mobile node (MN) to transmit a handover information message to a previous mobile access gateway (PMAG); allowing the PMAG to transmit a fast proxy binding update (FPBU) message to a local mobility anchor (LMA) on the basis of the handover information message received from the MN; allowing the LMA to transmit a handover initiation (HI) message including MN-ID and proxy-care-of address (CoA) of the PMAG to a new MAG (NMAG); transmitting a position update message to the NMAG if the MN is attached to a target BS that is connected to the NMAG; and allowing the NMAG to deliver a buffered packet to the MN.

Here, the MN can transmit a handover information message including a target base station identifier (BS-ID) to the PMAG.

The PMAG can obtain information related to the MN, such as MN-ID, MN-home-of address (HoA) and the proxy-CoA from the handover information message.

The FPBU message can include new-proxy-CoA (N-proxy-CoA) and the MN-ID.

The fast handover method can further include allowing the NMAG, which has received the HI message, to send a handover acknowledge (HAck) to the LMA Moreover, the fast handover method can further include allowing the LMA to receive the HAck and then to send an acknowledgement message of the FPBU message to the PMAG.

Packets destined to the MN-HoA of the MN can be tunneled from the PMAG to the NMAG.

If the MN is attached to the target BS that is connected to the NMAG, a network access authentication between the MN and the target BS can be performed and then a link layer connectivity can be completed.

On the other hand, the fast handover method can be performed by a fast handover system including a previous mobile access gateway (PMAG), configured to transmit a fast proxy binding update (FPBU) message to a local mobility anchor (LMA) on the basis of a handover information message received from a mobile node (MN); the LMA, configured to receive the FPBU message from the PMAG and then transmit a handover initiation (HI) message including MN-ID and proxy-care-of address (CoA) of the PMAG to a new MAG (NMAG); and the NMAG, configured to receive a position update message from the MN, if the MN is attached to a target BS that is connected to the NMAG, and to deliver a buffered packet to the MN.

Here, the MN can transmit a handover information message including a target base station identifier (BS-ID) to the PMAG.

The PMAG can obtain information related to the MN, such as MN-ID, MN-home-of address (HoA) and the proxy-CoA from the handover information message.

The FPBU message can include new-proxy-CoA (N-proxy-CoA) and the MN-ID.

The NMAG can receive the HI message and then sends a handover acknowledge (HAck) to the LMA In this case, the LMA can receive the HAck and then sends an acknowledgement message of the FPBU message to the PMAG Packets destined to the MN-HoA of the MN can be tunneled from the PMAG to the NMAG.

If the MN is attached to the target BS that is connected to the NMAG, a network access authentication between the MN and the target BS can be performed and then a link layer connectivity can be completed.

DETAIL DESCRIPTION

Hereinafter, a fast handover system and a method thereof according to an embodiment of the present invention will be described in detail with reference to the accompanying drawings.

A PMIPv6 protocol can be attached to an IPv6-based network and support an MN having no MIPv6 function. Even though a network-attached position is changed in the state in which the MN is connected to a correspondent node (CN), the MN can maintain the connectivity with the CN. In the PMIPv6 protocol, if the MN goes into the PMIPv6 domain to perform the connectivity authentication, the network can obtain a home address in the link by processing it as if the MN is always in the home network. Accordingly, a home network prefix can be assigned to the MN, and the home network address can follow the MN. The MN can see the PMIPv6 domain as if the PMIPv6 domain is formed by one home link.

Figure 1:
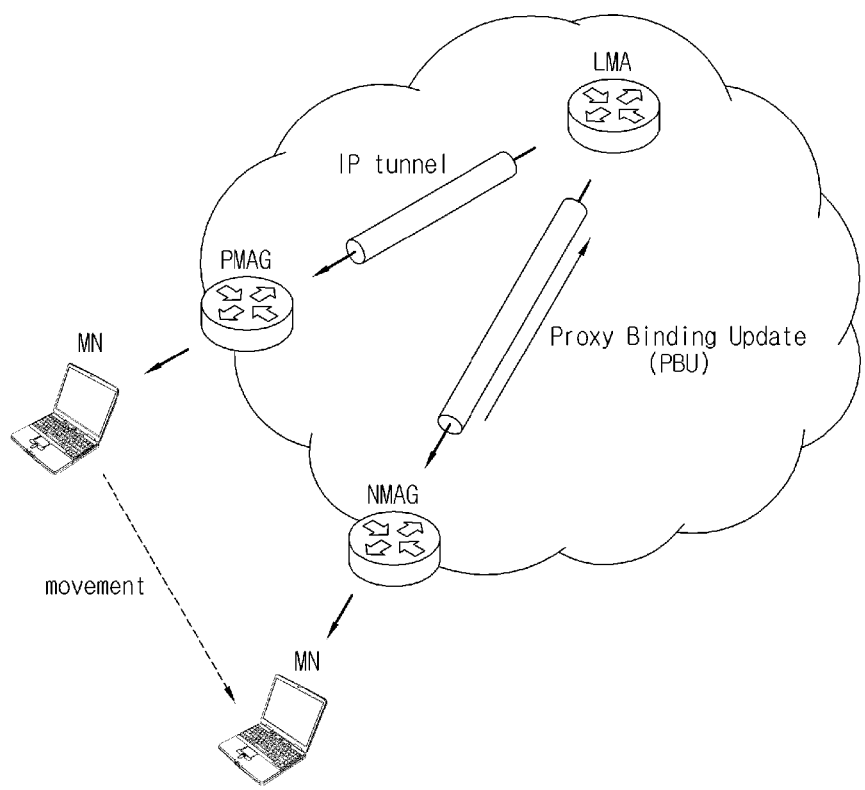
FIG. 1 shows PMIPv6 network topology and domain.

The PMIPv6 has an access gateway (MAG), which can send a PMIPv6 signaling message, instead of the MN, to provide the mobility to the MN having no MIPv6 function. The PMIPv6 also has a local mobile anchor (LMA), which manages the connectivity state of the MN and function as a topological anchor point of home network prefix of the MN. The LMA refers to a home agent (HA) for the MN in the PMIPv6 domain. The LMA is also an anchor point in the topology for the home prefix of the MN and the entity that is manages the reach ability of the MN. The LMA has the ability of the HA that is defined by the host-based MPv6 basic standard and additional ability for supporting the PMIPv6. The PMIPv6 network topology and domain is shown in FIG. 1.

During the connectivity authentication process, the MAG can obtain a profile of the MN in a policy store by receiving a MN-identifier (MN-ID) from the MN. Here, the MN-ID can be an ID of the MN given to the network in the connectivity authentication process. Typically, the ID of the MN can be the same type as a network access identifier (NAI) of the MN, defined by the access technology.

The profile of the MN can include parameters, such as MN-ID, LMA address, permitted address mode, roaming policy, etc, which are necessary to provide the network-based mobility service. Through the profile of the MN, the MAG can obtain information that is enough to emulate the home network of the MN in its own link. The MAG can obtain the profile of the MN in the policy store. Then, if there is the home network prefix of the MN in the profile, the MAG can transmit to the MN a router advertisement (RA) message including the home network prefix. The MN, which has received the RA message from the attached link, can set an IPv6 address in its own interface by the method that the attached link permits.

After obtaining the profile, the MAG can transmit a proxy binding update (PBU) message to the LMA in order to update the current position of the MN to the LMA. The PBU message can include network access identifier (NAI) option of the MN and other necessary options. If the LMA receives the MU message, the LMA can transmit to the MAG a proxy binding acknowledgement message including the home network prefix option of the MN. The LMA can also create a bi-directional tunnel to exchange traffics with the MAG and set a path for the home network prefix of the MN.

If the MN goes into one PMIPv6 domain and the access authentication is successful performed once, the network can guarantee that the MN is always in the home network and can enable the MN to obtain its own home address in this access link and to perform an address setting process. In other words, the home network prefix can be allotted to the MN, and the MN can always use this address at any position where the roaming is performed in the PMIPv6 domain. The MN can always see the PMIPv6 domain as if the PMIPv6 is formed by its own home link or one link.

The MAG can be located at the access link where the MN is anchored and perform the signaling related the mobility instead of the MN. From the viewpoint of the LMA, the MAG can be a special entity in the network, which is permitted to send a mobile IPv6 signaling message, instead of the MN. When the MN is attached to the access link that is connected to the MAG, the MN can provide its own ID, which is the MN-ID, for the authentication process. After the access authentication is successfully performed, the MAG can obtain the profile of the MN from the policy store, such as an authentication, authorization and account (AAA) infrastructure. The MAG can have all information for emulating the home network of the MN in the access link. Then, the MAG can start to periodically transmit a router advertisement message to the MN by broadcasting its own home network prefix.

The MN, which has received the router advertisement message in the access link, can attempt to set an address with its own interface by using the stateful mode by the allotment or the stateless mode by the arbitrary way on the basis of the modes permitted on the access link. After successful address setting process, the MN can obtain one address from its own home network prefix.

To update the current position of the MN to the LMA, the MAG can transmit a proxy binding update message to the LMA. This message can include the NAI ID of the MN and the home network prefix option. The source address of this message can become the MAG address of its own interface. If the proxy binding update request is received, the LMA can set the path in the tunnel by using the home network prefix and transmit a proxy binding update acknowledgement message to the MAG. The MAG, which has received the proxy binding update acknowledgement message, can set a tunnel between the MAG and the LMA and add this path into the default path. Thereafter, all traffics received from the MN can be routed to the LMA determined through the tunnel.

At his time, the MN can receive an effective home address from its own home network prefix at the current point of attachment. The serving MAG and the LMA can have the routing state that is adequate to process the traffics that is transmitted to or received from the MN. The LMA, which topologically becomes the anchor point for the home network prefix of the MN, can receive all packets that are transmitted from the communication correspondent node of the MN. The LMA can forward the packets that are transmitted to the MAG through the tunnel. At the opposite side of the tunnel, the MAG can remove the tunnel header of the received packet and then forward the packet to the access link of the MN.

Here, the MAG can function as a default router in the access link. All packets that are the MN transmits to the communication correspondent node can be received by the MAG. The packets can be forwarded to the LMA through the tunnel. At the opposite side of the tunnel, the LMA can remove the tunnel headers of the received packets and then route the packets to the correspondent node, which is the destination.

Figure 2:
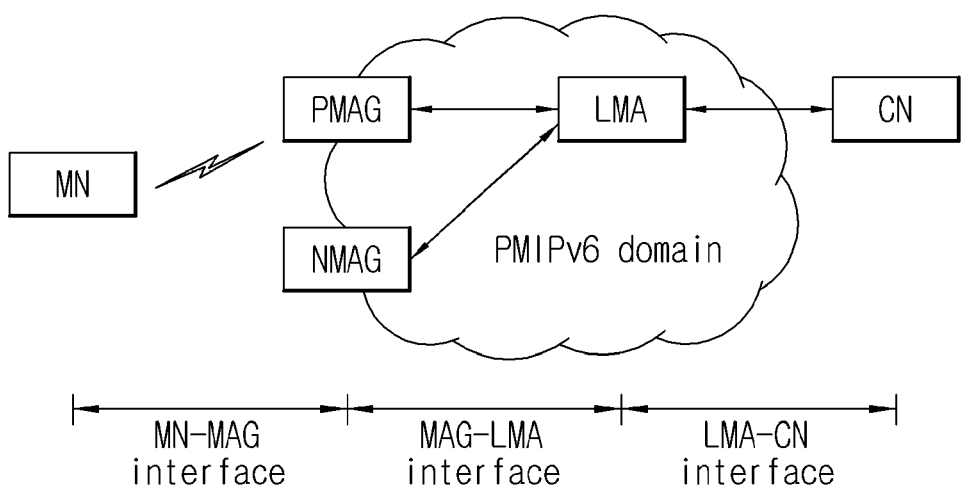
FIG. 2 is a block diagram showing briefly an interface of Proxy Mobile IPv6 in accordance with an embodiment of the present invention.

FIG. 2 is a block diagram showing briefly an interface of Proxy Mobile IPv6 in accordance with an embodiment of the present invention. As shown in FIG. 2, the proxy mobile IPv6 can be roughly divided into 3 interfaces, which are an MN-MAG interface, an MAG-LMA interface, and an LMA-CN interface. Here, the MAG functions as the access router, the LMA functions as the HA, and the CN is the communication correspondent node of the MN. The fast handover system and a method thereof in accordance with an embodiment of the present invention relate to the MN-MAG interface and the MAG-LMA interface. The LMA-CN interface is irrelevant to the subject.

Figure 3:
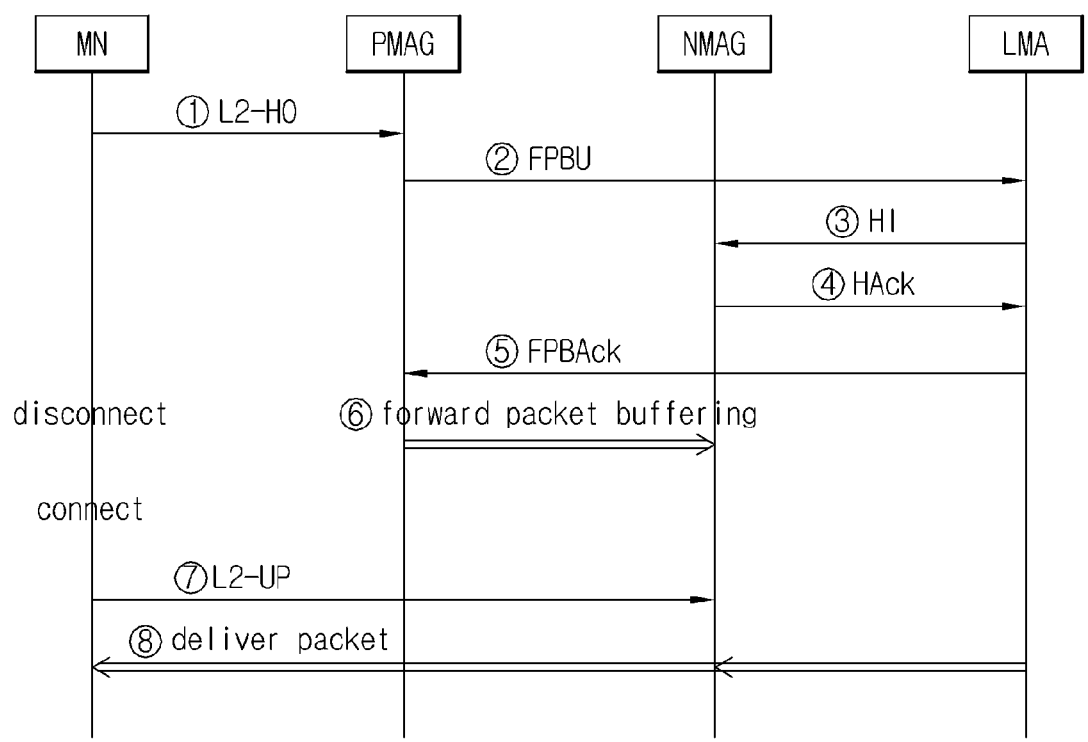
FIG. 3 is a flowchart showing a fast handover method in accordance with an embodiment of the present invention.

FIG. 3 is a flowchart showing a fast handover method in accordance with an embodiment of the present invention.

In the IEEE 802.16e, the MN can receive an adjacent advertisement message that is periodically advertised from a serving base station (BS), which provides the wireless connectivity to a pertinent network, when the MN is located at a position of the network. This message can include information related to all BSs that are adjacently located and network attributes of the BSs.

The MN, which has received the adjacent advertisement message, can obtain IDs of the adjacent BSs, quality of service (QoS) parameters, and channel information, which are used in order to more promptly perform the handover later.

Another method for acquiring network information is the scanning that is performed by the MN. The scanning refers to a process measuring the quality of downlink signals that are received from the adjacent BSs. The MN can obtain the ID list of the adjacent BSs through the adjacent advertisement message and manage the ID list as a candidate BS which selects an adequate BS on the basis of real-time link information obtained through the scanning in order to perform the handover.

While the handover is prepared, the MN can determine a target BS that is most adequate for performing the handover by using the magnitude of the signals received from the adjacent BSs and the QoS parameter, which are obtained in the previous process. The MN can also determine the handover in consideration of the service quality and signal magnitude that are provided from the current BS and announce the determined handover to the serving BS. The serving BS can transmit a handover information message including the target BS-ID to the previous MAG (PMAG).

At this time, all MAGs can have pairs of the BS-ID and the proxy-CoA. The proxy CoA refers to an address determined in the interface of the MAG and a tunnel transmission endpoint between the LMA and the MAG. The LMA can use the address as a temporary address of the MN and register the address to the binding cache entry for the MN.

The PMAG, which received the handover information message, can obtain information related to the MN such as MN-ID, MN-HoA (or home address of the MN), proxy-CoA, etc from the handover information message. The PMAG can also obtain the proxy-CoA of the NMAG (N-proxy-CoA) from the pair of the BS-ID and the proxy-CoA. Thereafter, the PMAG can transmit a fast proxy binding update (FPBU) message to the LMA in order to create a tunnel. The FPBU message can include the N-proxy-CoA and the MN-ID.

The LMA, which received the FPBU message, can transmit a handover initiation (HI) message to the NMAG. The NMAG, which has received the HI message, can send a handover acknowledgement (HAck) to the LMA as an acknowledgement to the HI message. Simultaneously, a bi-directional tunnel can be created between the PMAG and the NMAG. The P-proxy-CoA and the N-proxy-CoA can be opposite ends of the tunnel.

If the LMA successfully processes the HAck, the LMA can send a FPB acknowledgement (FPBAck) to the PMAG. Thereafter, the packets destined to the MN-HoA of the MN can be tunneled from the PMAG to the NMAG. The PMAG can decapsulate the packets received via the tunnel, connected to the LMA. The decapsulated packets can be encapsulated via the tunnel between the PMAG and the NMAG and delivered to the NMAG, the NMAG can buffer the packets until the connectivity with the MN is completed.

If the MN is attached to the target BS connected to the NMAG, the network access authentication can be performed. Then, if the link layer connectivity is completed, the MN (or the target BS) can transmit a position update message including target BS-ID to the NMAG. Thereafter, the NMAG can transmit the buffered packets to the MN.

The above detailed descriptions are only examples of the present invention, and a variety of modifications and forms can be made from such examples in the present invention. Thus, the detailed descriptions serve only for describing the present invention and by no means limit or restrict the spirit and scope of the present invention. It shall he understood that a large number of permutations and other equivalent embodiments are possible. The true scope of the present invention must be defined only by the spirit of the appended claims.

What is claimed is:

1. A fast handover method comprising:
  allowing a mobile node (MN) to transmit a handover information message to a previous mobile access gateway (PMAG);
  allowing the PMAG to transmit a fast proxy binding update (FPBU) message to a local mobility anchor (LMA) that is separate from the PMAG on the basis of the handover information message received from the MN;
  allowing the LMA to transmit a handover initiation (HI) message including MN-ID and proxy-care-of address (CoA) of the PMAG to a new MAG (NMAG) without communication of information in the handover information message between the PMAG and the NMAG;
  transmitting a position update message to the NMAG if the MN is attached to a target BS that is connected to the NMAG; and
  allowing the NMAG to deliver a buffered packet to the MN.

2. The fast handover method of claim 1, wherein the MN transmits the handover information message including a target base station identifier (BS-ID) to the PMAG.

3. The fast handover method of claim 1, wherein the PMAG obtains information related to the MN, including at least one of MN-ID, MN-home-of address (HoA) and the proxy-CoA from the handover information message.

4. The fast handover method of claim 1, wherein the FPBU message comprises new-proxy-CoA (N-proxy-CoA) and the MN-ID.

5. The fast handover method of claim 1, further comprising allowing the NMAG, which has received the HI message, to send a handover acknowledge (HAck) to the LMA.

6. The fast handover method of claim 5, further comprising allowing the LMA to receive the HAck and then to send an acknowledgement message of the FPBU message to the PMAG.

7. The fast handover method of claim 1, wherein packets destined to the MN-HoA of the MN are tunneled from the PMAG to the NMAG.

8. The fast handover method of claim 1, wherein, if the MN is attached to the target BS that is connected to the NMAG, a network access authentication between the MN and the target BS is performed and then a link layer connectivity is completed.

9. A fast handover system comprising:
a previous mobile access gateway (PMAG), configured to transmit a fast proxy binding update (FPBU) message to a local mobility anchor (LMA) that is separate from the PMAG on the basis of a handover information message received from a mobile node (MN);
the LMA, configured to receive the FPBU message from the PMAG and then transmit a handover initiation (HI) message including MN-ID and proxy-care-of address (CoA) of the PMAG to a new MAG (NMAG) without communication of information in the handover information message between the PMAG and the NMAG; and
the NMAG, configured to receive a position update message from the MN, if the MN is attached to a target BS that is connected to the NMAG, and to deliver a buffered packet to the MN.

10. The fast handover system of claim 9, wherein the MN transmits the handover information message including a target base station identifier (BS-ID) to the PMAG.

11. The fast handover system of claim 9, wherein the PMAG obtains information related to the MN, including at least one of MN-ID, MN-home-of address (HoA) and the proxy-CoA from the handover information message.

12. The fast handover system of claim 9, wherein the FPBU message comprises new-proxy-CoA (N-proxy-CoA) and the MN-ID.

13. The fast handover system of claim 9, wherein the NMAG receives the HI message and then sends a handover acknowledge (HAck) to the LMA.

14. The fast handover system of claim 13, wherein the LMA receives the HAck and then sends an acknowledgement message of the FPBU message to the PMAG.

15. The fast handover system of claim 9, wherein packets destined to the MN-HoA of the MN are tunneled from the PMAG to the NMAG.

16. The fast handover system of claim 9, wherein, if the MN is attached to the target BS that is connected to the NMAG, a network access authentication between the MN and the target BS is performed and then a link layer connectivity is completed.

* * * * *

UNITED STATES PATENT AND TRADEMARK OFFICE
CERTIFICATE OF CORRECTION

PATENT NO.         : 8,400,980 B2                                           Page 1 of 1
APPLICATION NO.    : 12/481920
DATED              : March 19, 2013
INVENTOR(S)        : Pyung Soo Kim, Eung Tea Kim and Seong Yong Kim It is certified that error appears in the above-identified patent and that said Letters Patent is hereby corrected as shown below:

In the Specification

Col. 1, Line 23,
  Delete "he"
  Insert --be--

Col. 1, Line 38,
  Delete "he"
  Insert --be--

Col. 4, Line 8,
  Delete "MU"
  Insert --PBU--

Col. 6, Line 32,
  Delete "he"
  Insert --be--

Signed and Sealed this
Twenty-sixth Day of November, 2013

Margaret A. Focarino
*Commissioner for Patents of the United States Patent and Trademark Office*